March 8, 1932.　　　G. W. PROCTOR　　　1,848,975

SPARE WHEEL CARRIER

Filed April 14, 1930

Inventor
George W. Proctor
By Blackmore, Spencer & Hick
Attorneys

Patented Mar. 8, 1932

1,848,975

UNITED STATES PATENT OFFICE

GEORGE W. PROCTOR, OF DETROIT, MICHIGAN, ASSIGNOR TO GENERAL MOTORS CORPORATION, OF DETROIT, MICHIGAN, A CORPORATION OF DELAWARE

SPARE WHEEL CARRIER

Application filed April 14, 1930. Serial No. 444,080.

To facilitate travel when a tire becomes punctured or otherwise deflated and permit any damage to be repaired at leisure, motor cars are often equipped with an extra or spare wheel carrying a fully inflated tire for quick substitution for the wheel carrying a deflated tire and this invention relates to an improved carrier for the spare wheel which may be mounted at the rear of the car or in any other convenient location.

The invention aims to provide an exceptionally sturdy spare wheel carrier which may be manufactured at low cost, of a few simple parts that may be easily assembled and applied to a conventional automobile without requiring expensive factory equipment and extensive machining operations.

To this end there is contemplated the provision of a mounting member or plate having attachment means for removable engagement with the same parts of the wheel hub by which the wheel is secured on the axle when in use and connections for mounting the hub carrying member, which may comprise a relatively wide and suitably reinforced stamping or supporting bracket depended from the bottom of the plate and inclined slightly forward to clear the mounted wheel and tire and a pair of diagonal brace arms dependent downwardly, forwardly and outwardly, and preferably formed of a single piece of channel iron having angularly bent end portions constituting divergent attachment legs and a central transversely extending portion for attachment with a V-shaped offset in the upper portion of the mounting plate, which avoids twisting of the channeled strap and locates any protruding parts of the attachment means below the face of the plate.

The invention will be better understood upon an inspection of the accompanying drawings taken with the following detailed specification having reference to a preferred but not necessarily the only embodiment, as incorporated as standard equipment on the 1930 sport model Chevrolet automobile.

Figure 1:
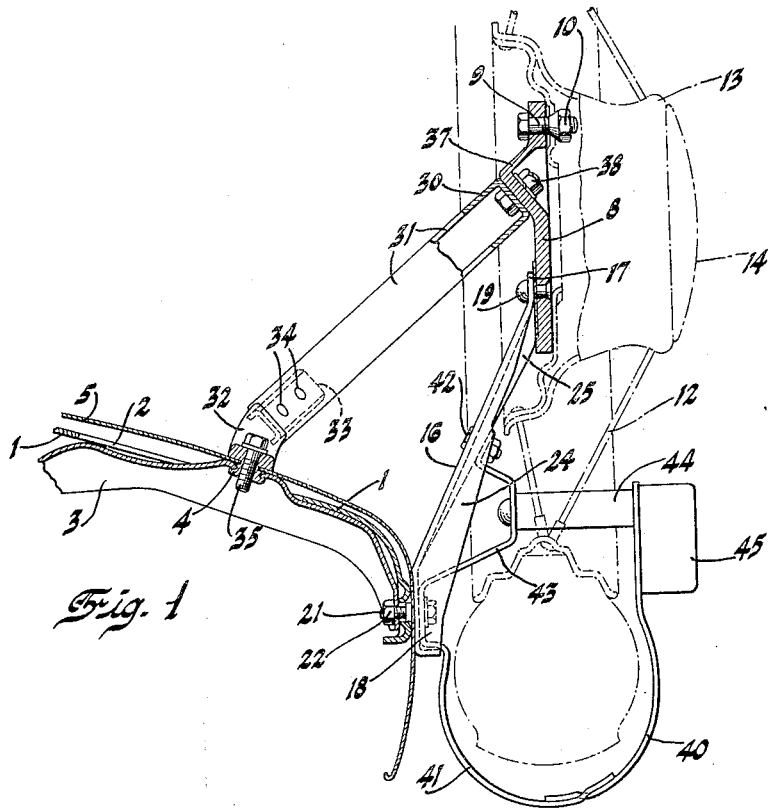
Figure 2:
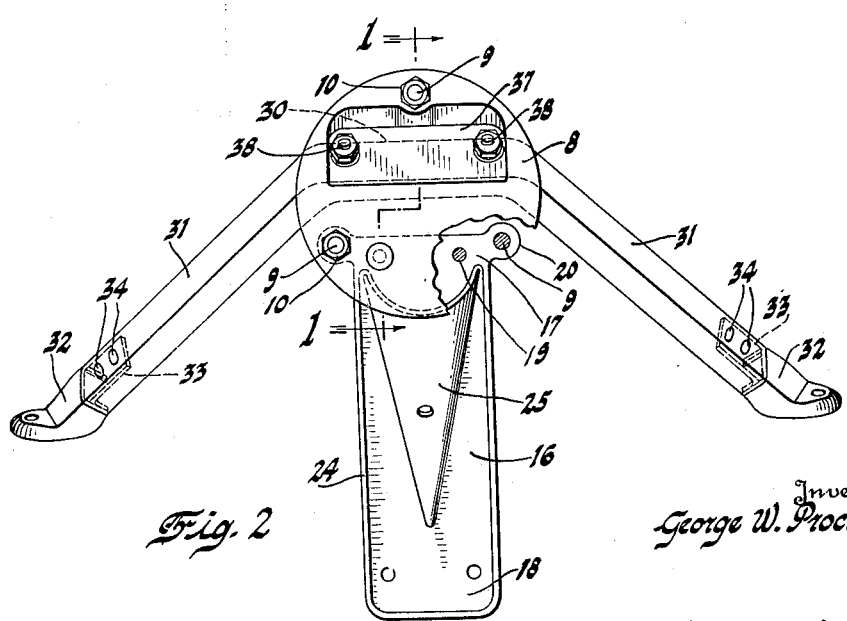

In the drawings, Figure 1 is a side elevation of the wheel carrier forming the present subject matter with parts thereof in section as on line 1—1 of Figure 2, and Figure 2 is a rear elevation partly broken away of the wheel carrier.

In use the carrier is conveniently mounted at the back of the car and for this reason the terms "front" and "rear" as used herein refer to the front and rear of an automobile.

Only so much of the chassis frame as will be necessary to illustrate the mounting of the carrier is shown in the drawings. It involves a rear transverse plate indicated at 1 which extends between the usual longitudinally extending side members of the chassis frame and is provided with a center opening 2 formed by cutting away portions of the plate to reduce weight. On the underside of the plate are located a series of spaced longitudinally extending straps as indicated at 3 which are preferably of channel shape with lateral flanges at the margins of the channel against which may be strapped the customary fuel tank (not shown). The central part of the strap 3 is shown as projected into the opening 2 and carries a nut 4 of a type sometimes referred to as a wampus nut, it being provided with an annular peripheral groove into which extends the marginal portion of the hole through which it extends, whereby it is securely held in position. Over these parts is positioned an ornamental cover plate 5 to conceal the unsightliness of the parts and provide a more pleasing appearance to the rear end of the car.

Located to the rear of the chassis frame and supported therefrom is a spare wheel carrier which includes a circular plate or hub mounting member 8, shown in the drawings as being a casting, but which might easily be formed as a stamping. Extending through the plate at circumferentially spaced points are shown three studs 9, each having screw threaded thereon a nut 10 for removably mounting to the plate the hub of a spare wheel. It will be understood that any type of detachable wheel may be carried, but for illustrative purposes a wire wheel indicated at 12 is shown by dotted lines in Figure 1. In this particular case the attachment nuts are concealed within the hub 13, and access thereto is had by removal of the hub cap or cover 14, which permits the insertion of a suitable tool through the hub into engagement with the nuts 10. To secure the plate to the frame there is shown in the drawings a relatively wide sheet metal stamping 16, whose central portion extends in a slightly inclined plane with vertically disposed upper and lower end portions 17 and 18 respectively. The flat upper end portion is secured against the front face of the hub supporting plate 8 near the lower end thereof, as by means of rivets 19, as well as by two of the bolts or studs 9 which project through lateral ears 20 at the upper corners of the plate, while the lower end portion 18 may be fastened to the frame member by means of a pair of spaced bolts or studs 21 extending through alined openings in the end portion and frame respectively, and preferably having ends peened over to prevent the removal or loss of the nuts 22 screw threaded thereon. Along the sides and bottom of the stamping 16 there is provided a rearwardly extending reinforcement flange 24 for stiffening the stamping against twisting strains. This flange is shown as being tapered or gradually decreasing in width from the bottom along the sides to the upper flat end porton 17. To lend strength to the upper parts of the stamping, a raised portion 25 is pressed rearwardly throughout the center of the stamping and this is tapered or of gradually decreasing width and depth from the upper flat portion 17 to a point adjacent the lower end portion 18. Thus the reinforcing flange 24 and the embossment 25 are arranged relative to each other in a manner to cooperatively lend a high degree of strength to the stamping.

To further support and brace the mounting plate 8, there are provided a pair of diagonal arms which are preferably constituted by a single piece iron strap, shown as of channel shape in section, with a central transversely extending portion 30 at the opposite end of which are the diverging legs 31. At the end of each leg 31 there is shown a cast metal attachment bracket 32 of angular shape, one arm having a shouldered portion for abutment with the end of the strap and an extended tongue 33 projecting into the channel and secured to the base thereof as by means of rivets 34, the other arm of the angular bracket 32 being secured to the frame by the screw stud 35 engaging with the nut 4. These divergent legs of the channel bar extend forwardly and downwardly and, therefore, unless the bar is twisted, its base throughout the central portion 30 will lie in a plane inclined rearwardly and downwardly at right angles to the inclined plane of the legs. It is not proposed to twist or otherwise distort the channel bar and for this reason, the plate 8 is provided in its upper portion with a V-shaped offset 37 affording a depression in the rear face of the plate and a boss or angular protuberance in the front face, one wall of which lies in substantially the inclined plane of the central bar portion 30 and is adapted to be secured in engagement therewith as by means of rivets or studs 38. The heads of the fastening studs or any protrudences of the attachment connections will thus lie in the depression or recess in the rear face of the plate formed by the offset, and forward of the plane of such face, so as not to offer any obstruction to parts of a spare wheel mounted on the carrier.

In order to prevent theft or unauthorized removal of the spare wheel, there may be provided a lock, which in the present case is illustrated as comprising a band encircling the tire and rim. The band is shown as consisting of two parti-circular straps 40—41, hinged together at adjacent ends by a detachable connection which may be in the form of a T-shaped head on one strap projected through an elongated slot in the other strap. This type of joint permits the straps to be swung relative to each other or if it is desired to separate them it permits detachment by turning the straps until the head lines up with the slot thru which it may be withdrawn. The end of the strap 41 opposite to the jointed end is secured to the stamped bracket 16 at spaced apart points as by means of a rivet or stud 42 and a clamp plate beneath the heads of the studs 21 with the portion between the spaced points of connection deflected rearwardly as at 43 and carrying a pin 44 that extends inside the spare wheel tire rim and between spokes for engagement by suitable lock mechanism carried within a lock housing or casing 45 on the free end of the strap 40.

From the above description it will be seen that there is thus provided a strong and rugged carrier for supporting a spare wheel at a convenient location and which may be very cheaply manufactured in large or small quantities, with parts thereof so arranged and constructed as to provide inherent strength. While this description has been more or less specific as to structural parts and their arrangement, it will be understood that the invention is not limited to exact details referred to but that such modifications may be made as come within the scope of the appended claims.

I claim:

1. A spare wheel carrier for motor vehicles and the like, including a plate-like hub supporting member having a V-shaped depression in its face providing a pair of angularly disposed walls, a channelled strap having a transversely extending central portion connected to the underside of one of said walls and a pair of divergent leg portions extending forwardly and downwardly in a plane at right angles to the central portion and being arranged for connection at their ends with a part of a vehicle, and a relatively wide supporting member secured at one end to the plate below said depression and arranged for attachment at its opposite end to a part of the vehicle, said member having strengthening flanges at its sides that taper from the lower to the upper end and a central raised portion tapering in size from its upper end to a point below the middle thereof.

2. In a spare wheel carrier for motor vehicles and the like, a substantially vertically disposed wheel hub supporting plate, mounting brackets therefor including a single strap having a transversely extending central portion lying in a downwardly and rearwardly inclined plane, and a pair of attachment feet integral with opposite ends of said central portion and diverging outwardly in a downwardly and forwardly inclined plane at a substantially right angle to the inclined plane of the central portion, and an angular surface on said supporting plate disposed in a plane corresponding to the plane of the inclination of said central portion of the strap for attachment thereto.

3. In a spare wheel carrier for motor vehicles and the like, a wheel hub supporting plate, mounting brackets therefor including a single strap having a transversely extending central portion lying in a downwardly and rearwardly inclined plane, and a pair of attachment feet integral with opposite ends of said central portion and diverging outwardly in a downwardly and forwardly inclined plane at a substantially right angle to the inclined plane of the central portion, and a boss on the front face of said plate having an inclined surface in the plane of said central portion for attachment thereto in abutting engagement.

4. In a spare wheel carrier for motor vehicles and the like, a wheel hub supporting plate, mounting brackets therefor including a single strap having a transversely extending central portion lying in a downwardly and rearwardly inclined plane, and a pair of attachment feet integral with opposite ends of said central portion and diverging outwardly in a downwardly and forwardly inclined plane at a substantially right angle to the inclined plane of the central portion, an angular offset in the plate providing a depression in the rear face thereof and a boss on the front face, having an inclined wall, and attachment means for securing said boss in engagement with said central portion, a part of said means lying in said depression and below the plane of the rear face of the plate.

5. In a spare wheel carrier for motor vehicles and the like, a mounting member including a strap of channel section having a transversely extending central portion and a pair of integral attachment legs at the ends of said central portion inclining downwardly and forwardly and thereby presenting the base of the channel in said central portion in a plane inclined rearwardly and downwardly, and a vertically disposed wheel supporting plate having a V-shaped portion out of the plane thereof providing a recess in its face and a protuberance on its back, one wall of which lies in the inclined plane of said base of the central portion of the strap, and a fastener for connecting said base and adjacent wall of the protuberance in abutting relation with a part thereof seated within said recess.

In testimony whereof I affix my signature.

GEORGE W. PROCTOR.